(12) United States Patent
So

(10) Patent No.: US 9,756,833 B2
(45) Date of Patent: Sep. 12, 2017

(54) CONDUCTIVE POLYMER MULTI-RIDGE ELECTRODE ANIMAL COLLAR

(71) Applicant: SOS Co. Inc., Torrance, CA (US)

(72) Inventor: Minjae So, Seoul (KR)

(73) Assignee: SOS Co. Inc., Torrance, CA (US)

( * ) Notice: Subject to any disclaimer, the term of this patent is extended or adjusted under 35 U.S.C. 154(b) by 0 days.

(21) Appl. No.: 14/211,380

(22) Filed: Mar. 14, 2014

(65) Prior Publication Data

US 2014/0261233 A1 Sep. 18, 2014

Related U.S. Application Data

(60) Provisional application No. 61/791,339, filed on Mar. 15, 2013.

(51) Int. Cl.
*A01K 15/02* (2006.01)
*A01K 27/00* (2006.01)

(52) U.S. Cl.
CPC .......... *A01K 15/021* (2013.01); *A01K 27/009* (2013.01)

(58) Field of Classification Search
CPC .... A01K 15/02; A01K 15/021; A01K 27/009; A01K 15/022; A01K 15/029
USPC ....... 119/720, 859, 712, 718, 719, 908, 765, 119/856, 862, 857, 858; 340/573.4, 340/573.2, 573.3
See application file for complete search history.

(56) References Cited

U.S. PATENT DOCUMENTS

| | | | |
|---|---|---|---|
| 4,802,482 A * | 2/1989 | Gonda | A01K 15/021 119/720 |
| D410,206 S | 5/1999 | Slater | |
| D417,835 S | 12/1999 | Williams | |
| 6,079,367 A | 6/2000 | Stapelfield et al. | |
| D439,708 S | 3/2001 | Jenkins | |
| 6,327,999 B1 * | 12/2001 | Gerig | A01K 15/021 119/712 |
| 6,598,563 B2 | 7/2003 | Kim et al. | |
| D478,831 S | 8/2003 | So | |
| D482,979 S | 12/2003 | So | |
| 6,907,844 B1 * | 6/2005 | Crist | A01K 15/022 119/718 |

(Continued)

OTHER PUBLICATIONS

Exhibition Guide, Interzoo 2012, May 2012, International Trade Fair for Pet Supplies, Nurnberg, Germany.

*Primary Examiner* — Trinh Nguyen
(74) *Attorney, Agent, or Firm* — Matthew J. Spark; Zuber Lawler & Del Duca LLP

(57) ABSTRACT

A collar for conditioning behavior in an animal and system and method for same are disclosed. The collar includes a main body configured to generate electric stimuli. A pair of conductive polymer multi-ridge electrodes extends outward in a concave configuration from base portion of main body at first end and second end of base portion such that electrodes and base portion form a unitary component. The pair of electrodes is configured to have inner and outer indentations integrally formed with base portion such that inner indentations are suitable for receiving smaller animals and outer indentations are suitable for receiving larger animals. A housing receives main body and is integrally formed with a pair of elongated planar members extending orthogonally from band portion of collar at first end and second end of housing such that collar is positioned around animal neck while inserted to main body for support.

29 Claims, 4 Drawing Sheets

(56) References Cited

U.S. PATENT DOCUMENTS

| | | | |
|---|---|---|---|
| 6,928,958 B2 | 8/2005 | Crist et al. | |
| 7,069,878 B2 | 7/2006 | Mugford | |
| D526,590 S | 8/2006 | So | |
| 7,222,589 B2 | 5/2007 | Lee et al. | |
| 7,252,051 B2 | 8/2007 | Napolez et al. | |
| 7,382,328 B2 | 6/2008 | Lee et al. | |
| D579,810 S | 11/2008 | Campman | |
| 7,503,285 B2 | 3/2009 | Mainini et al. | |
| 7,607,406 B2 | 10/2009 | So | |
| 7,644,685 B2 | 1/2010 | Groh et al. | |
| 7,667,607 B2 * | 2/2010 | Gerig | A01K 15/021 340/573.1 |
| D725,841 S * | 3/2015 | So | D30/152 |
| D725,848 S * | 3/2015 | So | D30/152 |
| D725,849 S * | 3/2015 | So | D30/152 |
| 2002/0139565 A1 | 10/2002 | Bradford | |
| 2003/0116101 A1 * | 6/2003 | Kim | A01K 15/021 119/720 |
| 2005/0235924 A1 | 10/2005 | Lee et al. | |
| 2006/0191494 A1 * | 8/2006 | Nottingham | A01K 15/021 119/859 |
| 2006/0283401 A1 * | 12/2006 | Mainini | A01K 27/009 119/859 |
| 2007/0204804 A1 | 9/2007 | Swanson et al. | |
| 2007/0209604 A1 | 9/2007 | Groh et al. | |
| 2007/0222624 A1 | 9/2007 | Eicken et al. | |
| 2008/0134987 A1 | 6/2008 | Lee et al. | |
| 2008/0141949 A1 | 6/2008 | Taylor | |
| 2008/0210176 A1 * | 9/2008 | Lalor | A01K 27/009 119/859 |
| 2009/0205583 A1 * | 8/2009 | So | A01K 15/021 119/719 |
| 2010/0050954 A1 | 3/2010 | Lee et al. | |
| 2010/0154721 A1 | 6/2010 | Gerig et al. | |
| 2011/0232585 A1 | 9/2011 | Rich et al. | |
| 2012/0272924 A1 * | 11/2012 | So | A01K 15/021 119/720 |

* cited by examiner

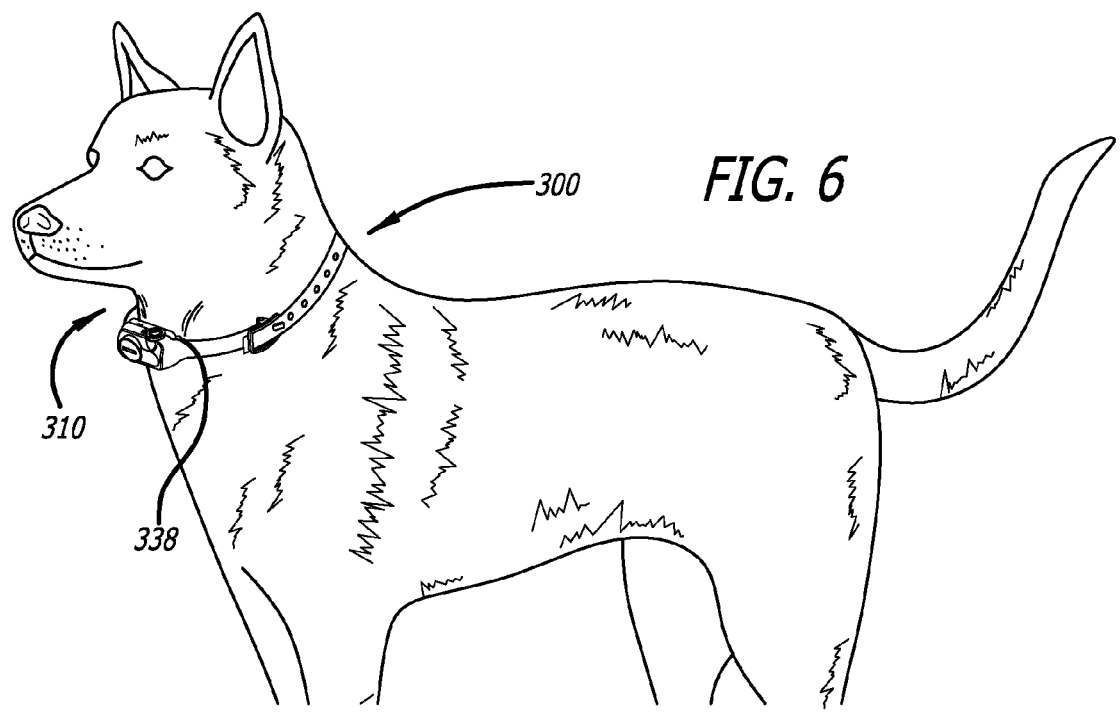
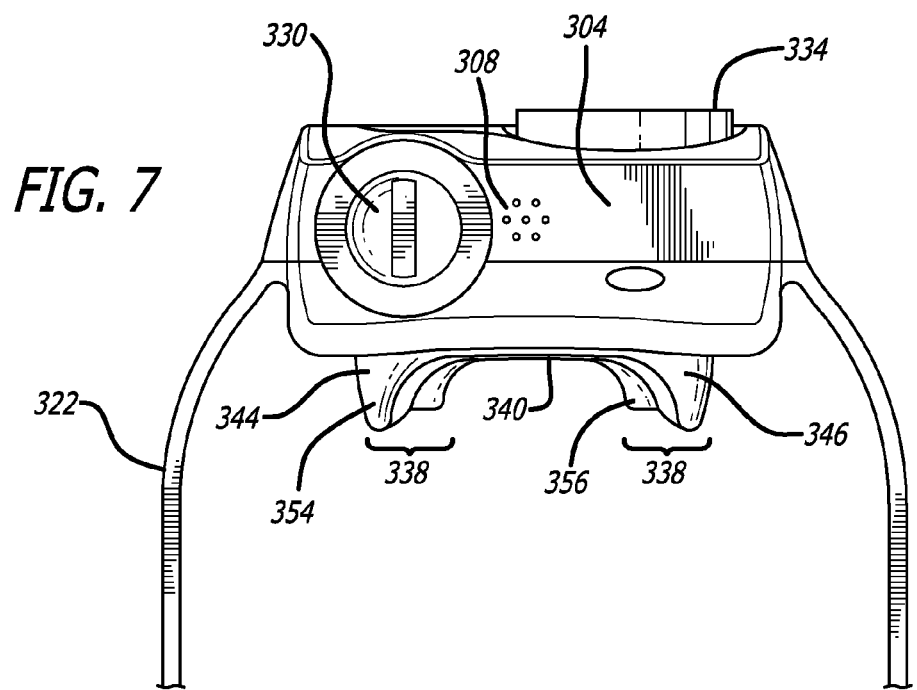

CONDUCTIVE POLYMER MULTI-RIDGE ELECTRODE ANIMAL COLLAR

CROSS REFERENCE TO RELATED APPLICATIONS

This application claims the benefit of U.S. Provisional Application No. 61/791,339, filed Mar. 15, 2013, which is incorporated by reference in its entirety.

TECHNICAL FIELD

The present invention relates to the field of animal collar devices and systems and methods for conditioning of an animal's behavior, and more particularly, to conductive animal collar devices capable of fitting a wide range of animals from small to large with enhanced aesthetic feel for the animal.

BACKGROUND

Conventional training collars for the conditioning of an animal's behavior generally consist of an apparatus mounted around the neck of an animal. When the animal behaves in an undesirable manner, electric stimulation may be applied, thereby leading the animal to behave in a desirable manner. Such conventional training collars consist of a collar placed around the neck of an animal, a main body that generates electric stimuli which is attached to the collar, and may include an electronic receiver that receives signals from a remote control that can be used to activate the electric stimuli or may include a sensor on the main body that activates the electric stimuli based on the vocalization or movement of an animal. The main body is generally comprised of a housing made of synthetic resins, an electric device mounted inside the housing, a pair of electrode terminals protruding from the housing that contact the animal's body such as the neck, and a control knob that controls the strength of the electricity (i.e. voltage or current) flowing through the electrode terminals.

The electrode terminals of the main body are formed by processing a metal bar typically made of stainless steel in order to conduct electricity when in contact with the animal's body. The stainless steel metal bar on such conventional training collars is left exposed, which leads to problems with the aesthetics. Additional problems with conventional stainless steel electrode terminals include the inability of the training collar to fit securely around the neck of animals of varying sizes, costs of materials, assembly of multiple parts, and costs to manufacture. It would thus be desirable to have animal training devices that are aesthetically pleasing, securely fit around the animal's neck, have low cost to manufacture, are fabricated from inexpensive materials, durable, and are easy to assemble, among other desirable features, as described herein.

SUMMARY

In a first aspect, there is provided herein an animal training collar for conditioning behavior in an animal. The collar includes a main body configured to generate electric stimuli therefrom having either an electronic receiver for receiving a plurality of signals from a remote control for activating the electric stimuli from a distance or a component disposed on the main body for activating the electric stimuli based on vocalization or movement of the animal. The collar further includes a pair of multi-ridge electrodes fabricated of a conductive material extending outwardly in a concave configuration from a base portion of a rear side of the main body at a first end and a second end of the base portion such that the electrodes and base portion form a unitary component. The pair of multi-ridge electrodes is configured to have inner and outer indentations integrally formed with the base portion such that the inner indentations are suitable for receiving smaller animals and the outer indentations are suitable for receiving larger animals.

In certain embodiments, the collar includes a detachable housing having side walls, a top and a bottom, and an open rear side for slidably receiving the main body therethrough. The housing is integrally formed with a pair of elongated planar members extending orthogonally from a band portion of the collar at a first end and a second end of the housing such that the collar is positioned around a neck of the animal while inserted to the main body for support.

In certain embodiments, the collar may be fabricated of flexible synthetic resins, plastic, leather, cloth, metal alloys and chains, and other suitable materials with flexible properties.

In certain embodiments, the main body further includes an intensity dial used to turn the animal collar on and off, to select the intensity level of the stimulation, and to test the animal collar.

In certain embodiments, the pair of multi-ridge electrodes and the base portion are fabricated by injection molding processed by way of at least one injection in which the injected materials are configured to be positioned on top of each other in a mold thereby forming the unitary component.

In certain embodiments, the pair of multi-ridge electrodes and the base portion may be fabricated of any suitable conductive polymer and like materials, including heat conductive plastic materials.

In certain embodiments, the pair of multi-ridge electrodes is fabricated from at least one of polyphenylene sulfide (PPS), grade number E-5109, and polyamide 66, grade number KN333C22.

In certain embodiments, the pair of multi-ridge electrodes is optimally positioned proximate to the animal's vocal chord area of the neck.

In certain embodiments, the pair of multi-ridge electrodes is configured to maintain the collar in place around the optimal position of the animal's neck such that a convex portion of the animal's neck is secured in the concave configuration of the pair of multi-ridge electrodes and the base portion of the unitary component.

In certain embodiments, the pair of multi-ridge electrodes is configured to be spaced in such a manner to provide effective stimulation to the animal such that the animal receives a correct message and appropriate stimulation in the conditioning of the animal's behavior regardless of the animal's size.

In certain embodiments, the pair of multi-ridge electrodes further includes an external electrode and an internal electrode at both the first end and the second end of the base portion.

In certain embodiments, the external electrode at the first end and the second end of the base portion have a width of from about 32.3 mm (1.27 inches) to about 42.3 mm (1.67 inches) and the internal electrode at the first end and the second end of the base portion have a width of from about 19.0 mm (0.75 inches) to about 29 mm (1.14 inches).

In certain embodiments, the external electrode at the first end and the second end of the base portion have a height of about 13.1 mm (0.52 inches) and the internal electrode at the first end and the second end of the base portion have a height of about 10.8 mm (0.43 inches).

In a second aspect, there is provided herein a conductive multi-ridge electrode assembly for use with an animal training collar for conditioning behavior in an animal. The assembly includes a main body configured to generate electric stimuli therefrom having either an electronic receiver for receiving a plurality of signals from a remote control for activating the electric stimuli from a distance or a component disposed on the main body for activating the electric stimuli based on vocalization or movement of the animal. The assembly further includes a pair of multi-ridge electrodes fabricated of a conductive material extending outwardly in a concave configuration from a base portion of a rear side of the main body at a first end and a second end of the base portion such that the electrodes and base portion form a unitary component. The pair of multi-ridge electrodes is configured to have inner and outer indentations integrally formed with the base portion such that the inner indentations are suitable for receiving smaller animals and the outer indentations are suitable for receiving larger animals. The pair of multi-ridge electrodes includes an external electrode and an internal electrode at both the first end and the second end of the base portion such that the external electrode is greater in height than the internal electrode.

In certain embodiments, the pair of multi-ridge electrodes and the base portion are fabricated by injection molding processed by way of at least one injection in which the injected materials are configured to be positioned on top of each other in a mold thereby forming the unitary component.

In certain embodiments, the pair of multi-ridge electrodes and the base portion may be fabricated of any suitable conductive polymer and like materials, including heat conductive plastic materials.

In certain embodiments, the pair of multi-ridge electrodes is fabricated from at least one of polyphenylene sulfide (PPS), grade number E-5109, and polyamide 66, grade number KN333C22.

In certain embodiments, the pair of multi-ridge electrodes is optimally positioned proximate to the animal's vocal chord area of the neck.

In certain embodiments, the pair of multi-ridge electrodes is configured to maintain the collar in place around the optimal position of the animal's neck such that a convex portion of the animal's neck is secured in the concave configuration of the pair of multi-ridge electrodes and the base portion of the unitary component.

In certain embodiments, the pair of multi-ridge electrodes is configured to be spaced in such a manner to provide effective stimulation to the animal such that the animal receives a correct message and appropriate stimulation in the conditioning of the animal's behavior regardless of the animal's size.

In certain embodiments, the external electrode at the first end and the second end of the base portion have a width of from about 32.3 mm (1.27 inches) to about 42.3 mm (1.67 inches) and the internal electrode at the first end and the second end of the base portion have a width of from about 19.0 mm (0.75 inches) to about 29 mm (1.14 inches).

In certain embodiments, the external electrode at the first end and the second end of the base portion have a height of about 13.1 mm (0.52 inches) and the internal electrode at the first end and the second end of the base portion have a height of about 10.8 mm (0.43 inches).

In a third aspect, there is provided herein a system for conditioning behavior in an animal using a conductive multi-ridge electrode assembly. The system includes a collar having a main body configured to generate electric stimuli therefrom. The main body includes either an electronic receiver for receiving a plurality of signals from a remote control for activating the electric stimuli from a distance or a component disposed on the main body for activating the electric stimuli based on vocalization or movement of the animal. The system further includes a pair of multi-ridge electrodes fabricated of a conductive material extending outwardly in a concave configuration from a base portion of a rear side of the main body at a first end and a second end of the base portion such that the electrodes and base portion form a unitary component. The pair of multi-ridge electrodes is configured to have inner and outer indentations integrally formed with the base portion such that the inner indentations are suitable for receiving smaller animals and the outer indentations are suitable for receiving larger animals. The system includes a detachable housing having side walls, a top and a bottom, and an open rear side for slidably receiving the main body therethrough. The housing is integrally formed with a pair of elongated planar members extending orthogonally from a band portion of the collar at a first end and a second end of the housing. The collar is configured to be positioned around the animal's neck while inserted to the main body for support such that a convex portion of the animal's neck is secured within the concave configuration of the pair of multi-ridge electrodes and the base portion of the unitary component. Electrical stimulation is configured to be applied to the animal in appropriate intervals.

In certain embodiments, the pair of multi-ridge electrodes and the base portion may be fabricated of any suitable conductive polymer and like materials, including heat conductive plastic materials.

In certain embodiments, the pair of multi-ridge electrodes is fabricated from at least one of polyphenylene sulfide (PPS), grade number E-5109, and polyamide 66, grade number KN333C22.

In certain embodiments, the pair of multi-ridge electrodes is configured to be spaced in such a manner to provide effective stimulation to the animal such that the animal receives a correct message and appropriate stimulation in the conditioning of the animal's behavior regardless of the animal's size.

In certain embodiments, the pair of multi-ridge electrodes further comprises an external electrode and an internal electrode at both the first end and the second end of the base portion.

In certain embodiments, the external electrode at the first end and the second end of the base portion have a width of from about 32.3 mm (1.27 inches) to about 42.3 mm (1.67 inches) and the internal electrode at the first end and the second end of the base portion have a width of from about 19.0 mm (0.75 inches) to about 29 mm (1.14 inches).

In certain embodiments, the external electrode at the first end and the second end of the base portion have a height of about 13.1 mm (0.52 inches) and the internal electrode at the first end and the second end of the base portion have a height of about 10.8 mm (0.43 inches).

In a fourth aspect, there is provided herein a method for conditioning behavior in an animal using a conductive multi-ridge electrode assembly. The method includes: providing a collar having a main body configured to generate electric stimuli therefrom, the main body having either an electronic receiver for receiving a plurality of signals from a remote control for activating the electric stimuli from a distance or a component disposed on the main body for activating the electric stimuli based on vocalization or movement of the animal; providing a pair of multi-ridge electrodes fabricated of a conductive material extending outwardly in a concave configuration from a base portion of a rear side of the main body at a first end and a second end of the base portion such that the electrodes and base portion form a unitary component, wherein the pair of multi-ridge electrodes is configured to have inner and outer indentations integrally formed with the base portion such that the inner indentations are suitable for receiving smaller animals and the outer indentations are suitable for receiving larger animals; providing a detachable housing having side walls, a top and a bottom, and an open rear side for slidably receiving the main body therethrough, wherein the housing is integrally formed with a pair of elongated planar members extending orthogonally from a band portion of the collar at a first end and a second end of the housing; positioning the collar around the animal's neck while inserted to the main body for support such that a convex portion of the animal's neck is secured within the concave configuration of the pair of multi-ridge electrodes and the base portion of the unitary component; and applying electrical stimulation to the animal in appropriate intervals.

In certain embodiments, the method further comprises fabricating the pair of multi-ridge electrodes from at least one of polyphenylene sulfide (PPS), grade number E-5109, and polyamide 66, grade number KN333C22.

In a further aspect, there is provided herein a conductive electrode for use with an animal training collar having a fabrication material selected from at least one of polyphenylene sulfide (PPS), grade number E-5109, and polyamide 66, grade number KN333C22.

Various advantages of this disclosure will become apparent to those skilled in the art from the following detailed description, when read in light of the accompanying drawings.

BRIEF DESCRIPTION OF THE DRAWINGS

FIG. 6 is a front perspective view of the use of the animal collar in FIG. 3.

FIG. 7 is a top plan view of the animal collar in FIG. 3.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In consideration of the figures, it is to be understood for purposes of clarity certain details of construction and/or operation are not provided in view of such details being conventional and well within the skill of the art upon disclosure of the document described herein.

The following terms shall have, for purposes of this application, the respective meanings set forth below:

"Conductive polymers" or "intrinsically conducting polymers" refer to organic polymers that conduct electricity. Such types of polymers may have metallic conductivity. The linear-backbone "polymer blacks" (e.g., polyacetylene, polypyrrole, and polyaniline) and their copolymers are the primary class of conductive polymers. Additional conductive polymers include, but are not necessarily limited to, poly(fluorine)s, polyphenylenes, polypyrenes, polyazulenes, polynaphthalenes, poly(acetylene)s (PAC), poly(p-phenylene vinylene) (PPV), poly(pyrrole)s (PPY), polycarbazoles, polyindoles, polyazepines, polyanilines (PANI), poly (thiophene)s (PT), poly(3,4-ethylenedioxythiophene) (PEDOT), poly(p-phenylene sulfide) (PPS), polyphenylene sulfide (PPS) grade number E-5109, and polyamide 66 grade number KN333C22, and poly(hexamethylene dodecanediamide) polymer (75% or more of polymer contents) containing carbon black.

Figure 1:
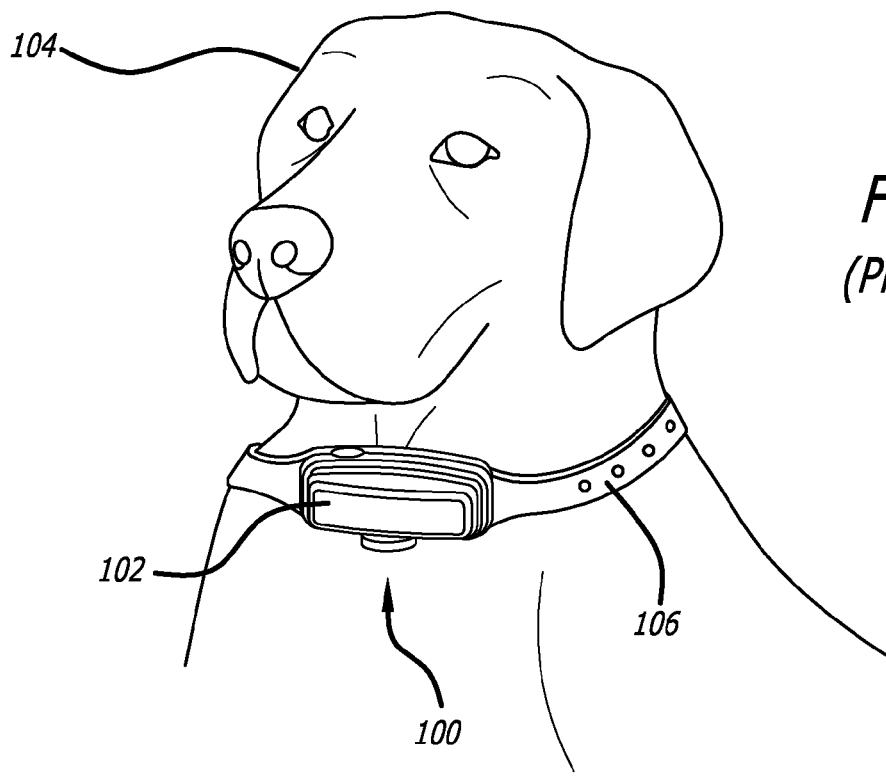
FIG. 1 is a front perspective view of the use of a conventional animal collar for training.

Referring now to FIG. 1 is a front perspective view of the use of a conventional animal collar 100 for training. As illustrated in FIG. 1, a conventional animal collar 100 for training includes a main body 102 that generates electric stimuli, and may include an electronic receiver that receives signals from a remote control that can be used to activate the electric stimuli or may include a sensor that activates the electric stimuli based on the vocalization, such as the barking of a dog 104, or movement of an animal, and a collar 106 placed around the neck of the animal while supporting the main body 102.

Figure 2:
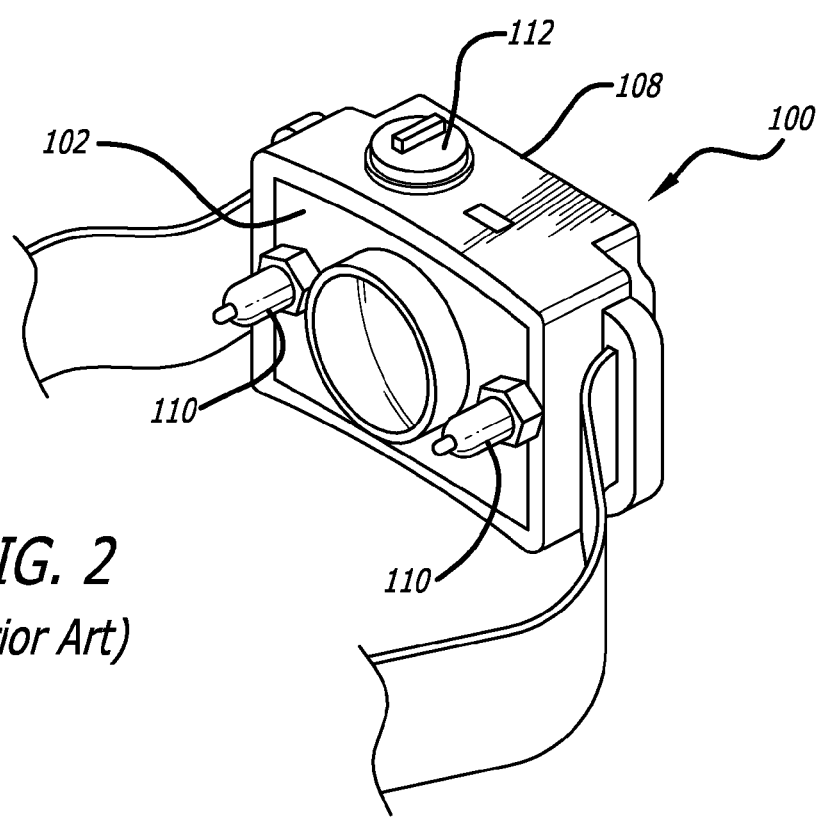
FIG. 2 is a rear perspective view of a conventional animal collar for training.

FIG. 2 is a rear perspective view of a conventional animal collar 100 for training. As illustrated in FIG. 2, the main body 102 of the animal collar 100 for training may include a housing 108 made of synthetic resins, an electric device (not shown) to be mounted inside the housing, a pair of electrode terminals 110 fabricated from stainless steel protruding from the housing 108 that come into contact with the animal's body, such as the neck, and a control knob 112 that controls the strength of the electricity flowing through the stimulation terminals 110.

Figure 3:
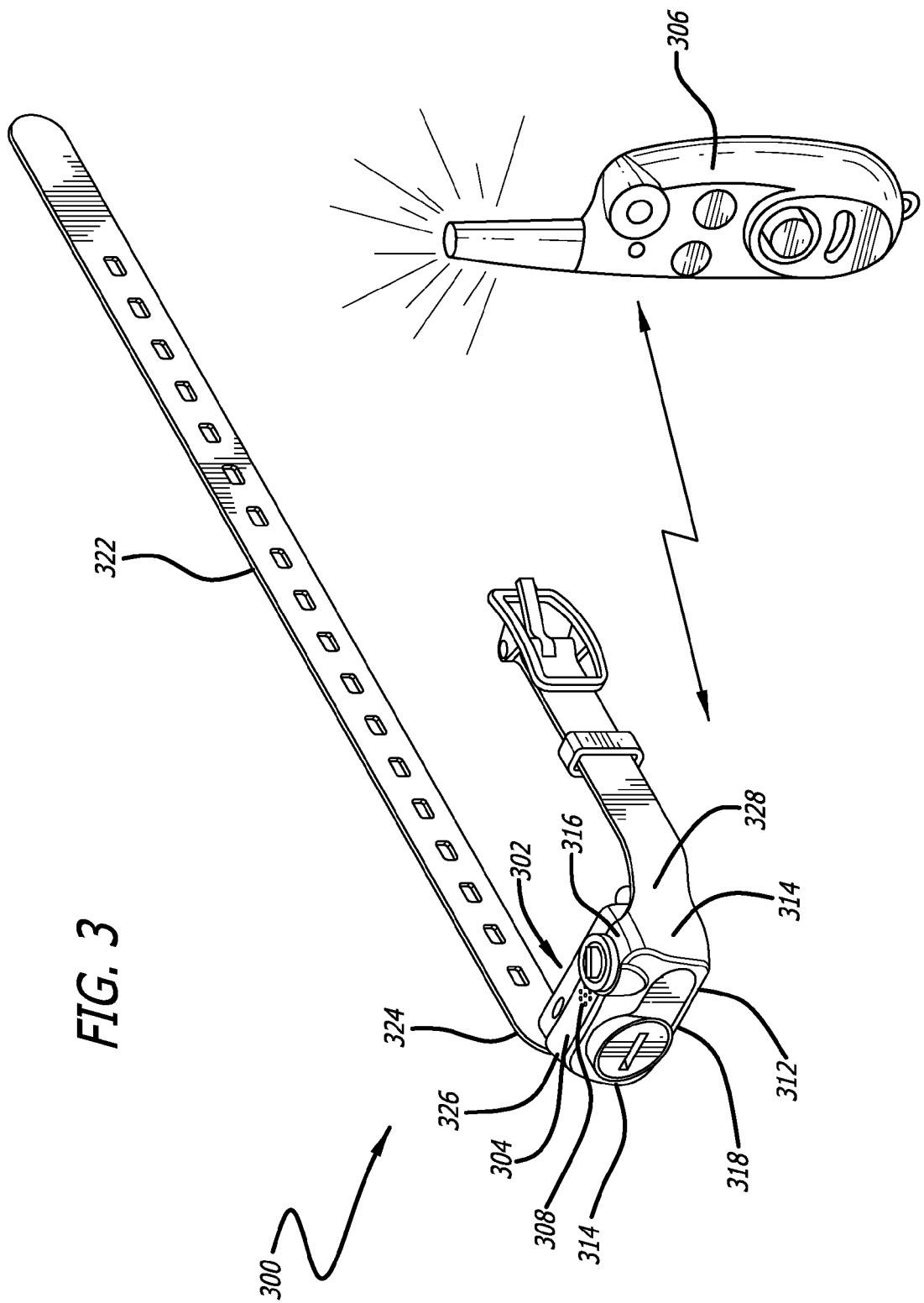
FIG. 3 is a perspective view of an animal collar according to one embodiment.

FIG. 3 is a front perspective view of an animal collar 300 according to one embodiment. As illustrated in FIG. 3, the animal collar 300 includes a main body 302 configured to generate electric stimuli having either an electronic receiver 304 that receives a plurality of signals from a remote control 306 that can be used to activate the electric stimuli from a predetermined distance or a component 308 disposed on the main body that activates the electric stimuli based on the vocalization or movement of an animal 310 (FIG. 6). A detachable housing 312 having side walls 314, a top 316 and a bottom 318, and an open rear side 320 (FIG. 4), is configured to slidably receive the main body 302 therethrough. The housing 312 is integrally formed with a pair of elongated planar members or straps 322 extending orthogonally from a band portion 324 of the collar 300 at a first end 326 and a second end 328 of the housing such that the collar is optimally positioned around a neck of the animal 310 (FIG. 6) while inserted to the main body 302 for support.

The collar 300 may be fabricated of flexible synthetic resins, plastic, leather, cloth, metal alloys and chains, and other suitable materials that are flexible, and the like.

Figure 4:
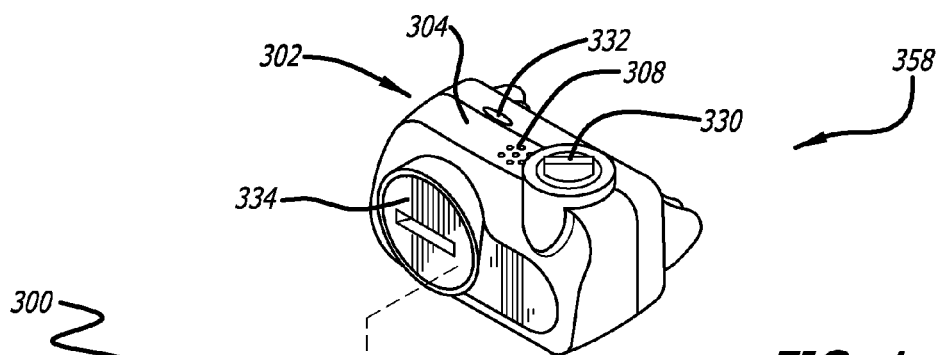
FIG. 4 is a front exploded perspective view of the animal collar in FIG. 3.

FIG. 4 is a front exploded perspective view of the animal collar 300 shown in FIG. 3. As illustrated in FIG. 4, the main body 302 includes an intensity dial 330 used to turn the animal collar 300 on and off, to select the intensity level, and to test the animal collar. When the intensity dial 330 is set to the pager mode, the animal collar 300 will only vibrate. Level one is the lowest stimulation level with level ten being the highest. On each level, a vibration is followed by the stimulation.

Referring further to FIG. 4, a battery cover 334 secures the placement of the batteries inside the main body 302 for the operation of the animal collar 300. The housing 312 having side walls 314, a top 316 and a bottom 318, an open rear side 320, and a partially open front side 336 to receive the battery cover 334 therethrough, is configured to be detachable from the main body 302 as shown in FIG. 4. The main body 302 is attached to the housing 312 of the animal collar 300 by inserting the intensity dial 330 within the housing and pulling the strap from the opposite side of the intensity dial over the rest of the main body.

Figure 5:
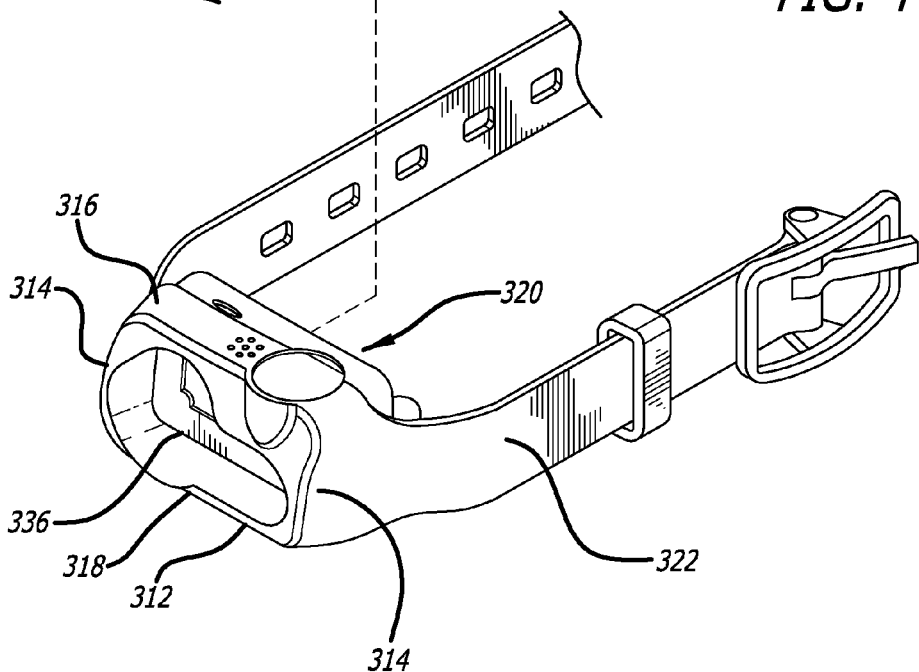
FIG. 5 is a rear perspective view of the main body in FIG. 3.
Figure 5:
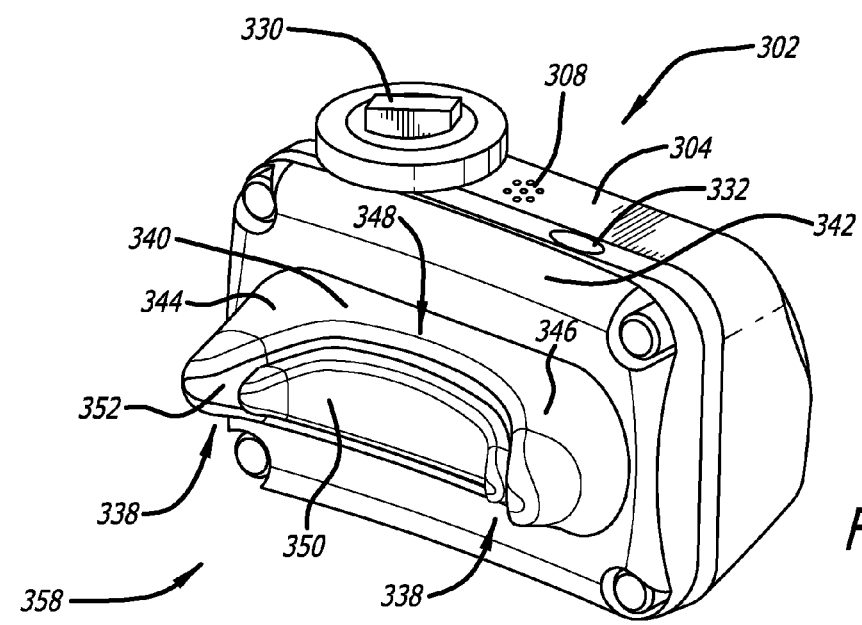

FIG. 5 is a rear perspective view of the main body 302 shown in FIG. 3 according to one embodiment. As illustrated in FIG. 5, the main body 302 is configured to generate electric stimuli therefrom having either an electronic receiver 304 for receiving a plurality of signals from a remote control 306 (FIG. 3) for activating the electric stimuli from a distance or a component 308 disposed on the main body for activating the electric stimuli based on vocalization or movement of the animal 310 (FIG. 6).

Referring further to FIG. 5, a pair of multi-ridge electrodes 338 fabricated of a conductive material is configured to extend outwardly in a concave configuration from a base portion 340 of a rear side 342 of the main body 302 at a first end 344 and a second end 346 of the base portion such that the electrodes and base portion form a unitary component 348. The pair of multi-ridge electrodes 338 is configured to have inner and outer indentations 350, 352 integrally formed with the base portion 340 such that the inner indentations 350 are suitable for receiving smaller animals and the outer indentations 352 are suitable for receiving larger animals.

It should be understood that the pair of multi-ridge electrodes 338 may include any suitable number of inner and outer indentations 350, 352 and is not necessarily limited to the minimal number of indentations disclosed herein in accordance with the present disclosure.

The pair of multi-ridge electrodes 338 and the base portion 340 are fabricated by injection molding processed by way of at least one injection, and more preferably by two injections in which the injected materials are configured to be positioned on top of each other in a mold thereby forming the unitary component 348.

It should be understood that the pair of multi-ridge electrodes 338 and the base portion 340 may be fabricated of any suitable conductive polymer and like materials, including heat conductive plastic materials. Conductive materials enable electricity to flow through when the pair of multi-ridge electrodes 338 comes into contact with the neck of the animal 310. A heat conducting plastic is advantageous to use for several reasons, including but not limited to: (1) lowers the temperature of the part by removing the heat spot; (2) decreases distortion of the part; (3) extends the product life by lowering the temperature; (4) improves the mechanical strength because of low temperature in use; (5) has a low coefficient of heat expansion; (6) has a chemical resistance that is unique to plastics; and (7) enables design flexibility.

In some embodiments, the pair of multi-ridge electrodes 338 is fabricated from at least one of polyphenylene sulfide (PPS), grade number E-5109 (available from Cool Polymers, Inc., North Kingstown, R.I.), and polyamide 66, grade number KN333C22 (available from API-Kolon Engineered Plastics, Lake Zurich, Ill.).

The pair of conductive multi-ridge electrodes 338 of the present disclosure is configured to follow the shape of the neck of the animal 310 (FIG. 6) for a wide range of animals from small to large. In one embodiment, the pair of multi-ridge electrodes 338 is optimally positioned proximate to the animal's 310 vocal chord area of the neck (FIG. 6). The pair of multi-ridge electrodes 338 is configured to maintain the collar in place around the optimal position of the animal's neck (FIG. 6) such that a convex portion of the animal's neck is secured in the concave configuration of the pair of multi-ridge electrodes and the base portion 340 of the unitary component 348.

FIG. 6 is a front perspective view of the use of the animal collar 300 in FIG. 3. It should be understood that the pair of multi-ridge electrodes 338 is configured to be spaced in such a manner to provide effective stimulation to the animal 310 such that the animal receives a correct message and appropriate stimulation in the conditioning of the animal's behavior regardless of the animal's size.

Referring now to FIG. 7 is a top plan view of the animal collar 300 in FIG. 3. The pair of multi-ridge electrodes 338 of the present disclosure further comprises an external electrode 354 and an internal electrode 356 at both the first end 344 and the second end 346 of the base portion 340. In some embodiments, the external electrode 354 at the first end 344 and the second end 346 of the base portion 340 have a width of from about 32.3 mm (1.27 inches) to about 42.3 mm (1.67 inches) and the internal electrode 356 at the first end and the second end of the base portion have a width of from about 19.0 mm (0.75 inches) to about 29.0 mm (1.14 inches).

In some embodiments, the external electrode 354 at the first end 344 and the second end 346 of the base portion 340 have a height of about 13.1 mm (0.52 inches) and the internal electrode 356 at the first end and the second end of the base portion have a height of about 10.8 mm (0.43 inches).

It should be understood that the dimensions of the pair of multi-ridge electrodes 338 are not necessarily limited to the ranges disclosed herein and may include other various ranges suitable for use with the animal collar 300 and system and method of use of same in accordance with the present disclosure.

The conductive multi-ridge electrode animal collar 300 of the present disclosure provides numerous advantages over conventional animal training collars. Some of these advantages include, but are not necessarily limited to: aesthetically pleasing, configured to fit a wide range of animals of various sizes from small to large, assembly is easy due to a unitary molded component, lower cost of conductive polymer materials, offer effective conductivity in animals, ergonomically designed, low cost to manufacture, easy to care for and clean, and durability.

In other embodiments, a conductive multi-ridge electrode assembly 358 for use with an animal training collar 300 is disclosed as already described above and illustrated in FIGS. 3-7.

In still other embodiments, a system for conditioning behavior in an animal using a conductive multi-ridge electrode assembly 358, which is substantially disclosed as already described above and illustrated in FIGS. 3-7, is provided herein. The system includes a collar 300 having a main body 302 configured to generate electric stimuli therefrom. The main body 302 includes either an electronic receiver 304 for receiving a plurality of signals from a remote control 306 (FIG. 3) for activating the electric stimuli from a distance or a component 308 disposed on the main body for activating the electric stimuli based on vocalization or movement of the animal 310 (FIG. 6).

The system further includes a pair of multi-ridge electrodes 338 fabricated of a conductive material extending outwardly in a concave configuration from a base portion 340 of a rear side 342 of the main body 302 at a first end 344 and a second end 346 of the base portion such that the electrodes and base portion form a unitary component 348. The pair of multi-ridge electrodes 338 is configured to have inner and outer indentations 350, 352 integrally formed with the base portion 340 such that the inner indentations 350 are suitable for receiving smaller animals and the outer indentations 352 are suitable for receiving medium to larger animals.

The system includes a detachable housing 312 having side walls 314, a top 316 and a bottom 318, and an open rear side 320 for slidably receiving the main body 302 therethrough. The housing 312 is integrally formed with a pair of elongated planar members 322 extending orthogonally from a band portion 324 of the collar at a first end 326 and a second end 328 of the housing.

As shown in FIG. 6, the collar 300 is configured to be positioned around the animal's neck while inserted to the main body 302 for support such that a convex portion of the animal's neck is secured within the concave configuration of the pair of multi-ridge electrodes 338 and the base portion 340 of the unitary component 348. Electrical stimulation is configured to be applied to the animal 310 in appropriate intervals via either remote control 306 or sensor 308.

In another embodiment, a conductive electrode for use with an animal training collar earlier disclosed herein is fabricated from at least one of polyphenylene sulfide (PPS), grade number E-5109 (available from Cool Polymers, Inc., North Kingstown, R.I.), and polyamide 66, grade number KN333C22 (available from API-Kolon Engineered Plastics, Lake Zurich, Ill.).

In further embodiments, a method for conditioning behavior in an animal using a conductive multi-ridge electrode assembly 358, which is substantially disclosed as already described above and illustrated in FIGS. 3-7, is provided herein. The method includes: providing a collar 300 having a main body 302 configured to generate electric stimuli therefrom, the main body having either an electronic receiver 304 for receiving a plurality of signals from a remote control 306 for activating the electric stimuli from a distance or a component 308 disposed on the main body for activating the electric stimuli based on vocalization or movement of the animal 310; providing a pair of multi-ridge electrodes 338 fabricated of a conductive material extending outwardly in a concave configuration from a base portion 340 of a rear side 342 of the main body 302 at a first end 344 and a second end 346 of the base portion such that the electrodes and base portion form a unitary component 348, wherein the pair of multi-ridge electrodes is configured to have inner and outer indentations 350, 352 integrally formed with the base portion such that the inner indentations 350 are suitable for receiving smaller animals and the outer indentations 352 are suitable for receiving larger animals; providing a detachable housing 312 having side walls 314, a top 316 and a bottom 318, and an open rear side 320 for slidably receiving the main body 302 therethrough, wherein the housing is integrally formed with a pair of elongated planar members 322 extending orthogonally from a band portion 324 of the collar 300 at a first end 326 and a second end 328 of the housing; positioning the collar 300 around the animal's neck while inserted to the main body 302 for support such that a convex portion of the animal's neck is secured within the concave configuration of the pair of multi-ridge electrodes 338 and the base portion 340 of the unitary component 348; and applying electrical stimulation to the animal 310 in appropriate intervals.

In some embodiments, the method includes fabricating the pair of multi-ridge electrodes 338 and the base portion 340 from at least one of polyphenylene sulfide (PPS), grade number E-5109 (available from Cool Polymers, Inc., North Kingstown, R.I.), and polyamide 66, grade number KN333C22 (available from API-Kolon Engineered Plastics, Lake Zurich, Ill.).

It should be understood that the application of the electrical stimulation is not necessarily limited to any set interval(s) as any such appropriate intervals suitable for use with the animal collar 300 are contemplated in accordance with the present disclosure.

Several of the features and functions disclosed above may be combined into different systems or applications, or combinations of systems and applications. Various presently unforeseen or unanticipated alternatives, modifications, variations or improvements therein may be subsequently made by those skilled in the art, each of which is also intended to be encompassed by the following claims.

What is claimed is:

1. An animal training collar for conditioning behavior in an animal, comprising:
 a main body configured to generate electric stimuli therefrom having either an electronic receiver for receiving a plurality of signals from a remote control for activating the electric stimuli from a distance or a component disposed on the main body for activating the electric stimuli based on vocalization or movement of the animal; and
 a pair of multi-ridge electrodes fabricated of a conductive material extending outwardly in a concave configuration from a base portion of a rear side of the main body at a first end and a second end of the base portion such that the electrodes and base portion form a unitary component, wherein the pair of multi-ridge electrodes is configured to have inner and outer indentations integrally formed with the base portion such that the inner indentations are suitable for receiving smaller animals and the outer indentations are suitable for receiving larger animals.

2. The animal training collar of claim 1 further comprising a detachable housing having side walls, a top and a bottom, and an open rear side for slidably receiving the main body therethrough, wherein the housing is integrally formed with a pair of elongated planar members extending orthogonally from a band portion of the collar at a first end and a second end of the housing such that the collar is positioned around a neck of the animal while inserted to the main body for support.

3. The animal training collar of claim 1, wherein the collar may be fabricated of flexible synthetic resins, plastic, leather, cloth, metal alloys and chains, and other suitable materials with flexible properties.

4. The animal training collar of claim 1, wherein the main body further comprises an intensity dial used to turn the animal collar on and off, to select the intensity level of the stimulation, and to test the animal collar.

5. The animal training collar of claim 1, wherein the pair of multi-ridge electrodes and the base portion are fabricated by injection molding processed by way of at least one injection in which the injected materials are configured to be positioned on top of each other in a mold thereby forming the unitary component.

6. The animal training collar of claim 1, wherein the pair of multi-ridge electrodes and the base portion may be fabricated of any suitable conductive polymer and like materials, including heat conductive plastic materials.

7. The animal training collar of claim 1, wherein the pair of multi-ridge electrodes is fabricated from at least one of polyphenylene sulfide (PPS), grade number E-5109, and polyamide 66, grade number KN333C22.

8. The animal training collar of claim 1, wherein the pair of multi-ridge electrodes is optimally positioned proximate to the animal's vocal chord area of the neck.

9. The animal training collar of claim 8, wherein the pair of multi-ridge electrodes is configured to maintain the collar in place around the optimal position of the animal's neck such that a convex portion of the animal's neck is secured in the concave configuration of the pair of multi-ridge electrodes and the base portion of the unitary component.

10. The animal training collar of claim 1, wherein the pair of multi-ridge electrodes is configured to be spaced in such a manner to provide effective stimulation to the animal such that the animal receives a correct message and appropriate stimulation in the conditioning of the animal's behavior regardless of the animal's size.

11. The animal training collar of claim 1, wherein the pair of multi-ridge electrodes further comprises an external electrode and an internal electrode at both the first end and the second end of the base portion.

12. The animal training collar of claim 11, wherein the external electrode at the first end and the second end of the base portion have a width of from about 32.3 mm to about 42.3 mm and the internal electrode at the first end and the second end of the base portion have a width of from about 19.0 mm to about 29.0 mm.

13. The animal training collar of claim 11, wherein the external electrode at the first end and the second end of the base portion have a height of about 13.1 mm and the internal electrode at the first end and the second end of the base portion have a height of about 10.8 mm.

14. A conductive multi-ridge electrode assembly for use with an animal training collar for conditioning behavior in an animal, comprising:
a main body configured to generate electric stimuli therefrom having either an electronic receiver for receiving a plurality of signals from a remote control for activating the electric stimuli from a distance or a component disposed on the main body for activating the electric stimuli based on vocalization or movement of the animal;
a pair of multi-ridge electrodes fabricated of a conductive material extending outwardly in a concave configuration from a base portion of a rear side of the main body at a first end and a second end of the base portion such that the electrodes and base portion form a unitary component, the pair of multi-ridge electrodes is configured to have inner and outer indentations integrally formed with the base portion such that the inner indentations are suitable for receiving smaller animals and the outer indentations are suitable for receiving larger animals;
wherein the pair of multi-ridge electrodes is comprised of an external electrode and an internal electrode at both the first end and the second end of the base portion such that the external electrode is greater in height than the internal electrode.

15. The conductive multi-ridge electrode assembly of claim 14, wherein the pair of multi-ridge electrodes and the base portion are fabricated by injection molding processed by way of at least one injection in which the injected materials are configured to be positioned on top of each other in a mold thereby forming the unitary component.

16. The conductive multi-ridge electrode assembly of claim 14, wherein the pair of multi-ridge electrodes and the base portion may be fabricated of any suitable conductive polymer and like materials, including heat conductive plastic materials.

17. The conductive multi-ridge electrode assembly of claim 14, wherein the pair of multi-ridge electrodes is fabricated from at least one of polyphenylene sulfide (PPS), grade number E-5109, and polyamide 66, grade number KN333C22.

18. The conductive multi-ridge electrode assembly of claim 14, wherein the pair of multi-ridge electrodes is optimally positioned proximate to the animal's vocal chord area of the neck.

19. The conductive multi-ridge electrode assembly of claim 18, wherein the pair of multi-ridge electrodes is configured to maintain the collar in place around the optimal position of the animal's neck such that a convex portion of the animal's neck is secured in the concave configuration of the pair of multi-ridge electrodes and the base portion of the unitary component.

20. The conductive multi-ridge electrode assembly of claim 14, wherein the pair of multi-ridge electrodes is configured to be spaced in such a manner to provide effective stimulation to the animal such that the animal receives a correct message and appropriate stimulation in the conditioning of the animal's behavior regardless of the animal's size.

21. The conductive multi-ridge electrode assembly of claim 14, wherein the external electrode at the first end and the second end of the base portion have a width of from about 32.3 mm to about 42.3 mm and the internal electrode at the first end and the second end of the base portion have a width of from about 19.0 mm to about 29.0 mm.

22. The conductive multi-ridge electrode assembly of claim 14, wherein the external electrode at the first end and the second end of the base portion have a height of about 13.1 mm and the internal electrode at the first end and the second end of the base portion have a height of about 10.8 mm.

23. A system for conditioning behavior in an animal using a conductive multi-ridge electrode assembly, comprising:
a collar having a main body configured to generate electric stimuli therefrom, the main body having either an electronic receiver for receiving a plurality of signals from a remote control for activating the electric stimuli from a distance or a component disposed on the main body for activating the electric stimuli based on vocalization or movement of the animal;
a pair of multi-ridge electrodes fabricated of a conductive material extending outwardly in a concave configuration from a base portion of a rear side of the main body at a first end and a second end of the base portion such that the electrodes and base portion form a unitary component, wherein the pair of multi-ridge electrodes is configured to have inner and outer indentations integrally formed with the base portion such that the inner indentations are suitable for receiving smaller animals and the outer indentations are suitable for receiving larger animals;

a detachable housing having side walls, a top and a bottom, and an open rear side for slidably receiving the main body therethrough, wherein the housing is integrally formed with a pair of elongated planar members extending orthogonally from a band portion of the collar at a first end and a second end of the housing;

wherein the collar is configured to be positioned around the animal's neck while inserted to the main body for support such that a convex portion of the animal's neck is secured within the concave configuration of the pair of multi-ridge electrodes and the base portion of the unitary component; and electrical stimulation is configured to be applied to the animal in appropriate intervals.

24. The system of claim 23, wherein the pair of multi-ridge electrodes and the base portion may be fabricated of any suitable conductive polymer and like materials, including heat conductive plastic materials.

25. The system of claim 23, wherein the pair of multi-ridge electrodes is fabricated from at least one of polyphenylene sulfide (PPS), grade number E-5109, and polyamide 66, grade number KN333C22.

26. The system of claim 23, wherein the pair of multi-ridge electrodes is configured to be spaced in such a manner to provide effective stimulation to the animal such that the animal receives a correct message and appropriate stimulation in the conditioning of the animal's behavior regardless of the animal's size.

27. The system of claim 23, wherein the pair of multi-ridge electrodes further comprises an external electrode and an internal electrode at both the first end and the second end of the base portion.

28. The system of claim 27, wherein the external electrode at the first end and the second end of the base portion have a width of from about 32.3 mm to about 42.3 mm and the internal electrode at the first end and the second end of the base portion have a width of from about 19.0 mm to about 29.0 mm.

29. The system of claim 27, wherein the external electrode at the first end and the second end of the base portion have a height of about 13.1 mm and the internal electrode at the first end and the second end of the base portion have a height of about 10.8 mm.

* * * * *